UNITED STATES PATENT OFFICE.

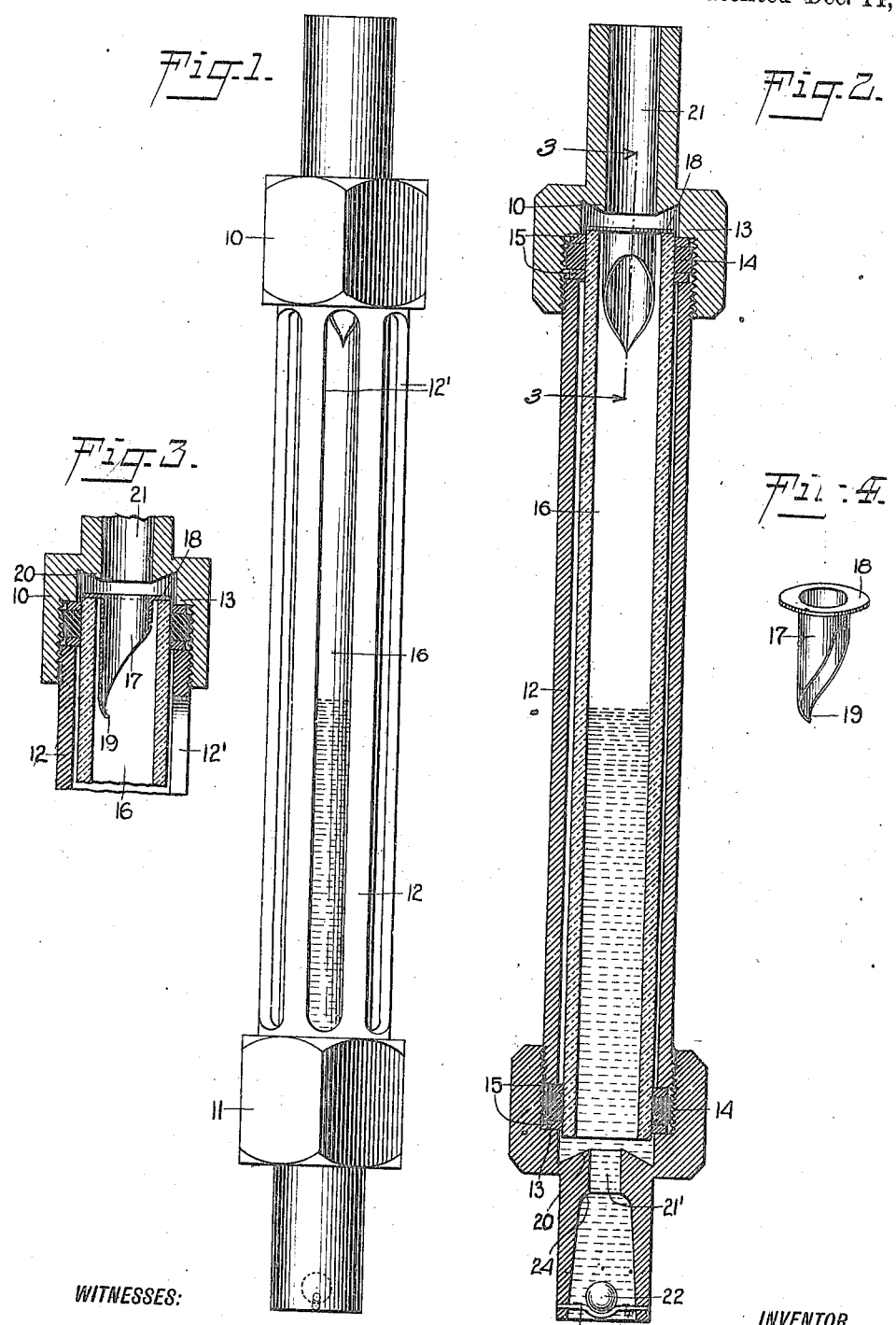

GEORGE ERNST, OF NEWARK, NEW JERSEY.

SAFETY GAGE-GLASS.

1,164,484.  Specification of Letters Patent.  Patented Dec. 14, 1915.

Application filed December 17, 1914. Serial No. 877,700.

*To all whom it may concern:*

Be it known that I, GEORGE ERNST, a citizen of the United States, and a resident of Newark, in the county of Essex and State of New Jersey, have invented a new and Improved Safety Gage-Glass, of which the following is a full, clear, and exact description.

This invention relates to gage glasses for steam or hot water boilers or the like, and has particular reference to important novel details of construction having for their purposes the increase of safety both to the glass and to the operator, and to make the readings of the glass more legible than any devices heretofore commonly proposed.

More definitely stated, I provide socket pieces of peculiar construction into which the ends of the glass proper are fitted out of contact with the structure of the sockets, a tubular guard being provided surrounding the gage glass and connected rigidly to said socket pieces.

Another object of the invention is to provide a peculiar form of thimble to direct the condensation water through the tube free from the inner wall thereof whereby the erosion or damage otherwise to the tube is eliminated.

The foregoing and other objects of the invention will hereinafter be more fully described and claimed and illustrated in the drawings forming a part of this specification in which like characters of reference indicate corresponding parts in all the views, and in which—

Figure 1 is a front elevation of my improvement; Fig. 2 is a vertical transverse section of the same; Fig. 3 is a vertical sectional view of a detail on the line 3—3 of Fig. 2 and at right angles to Fig. 2; and Fig. 4 is a perspective view of the thimble above mentioned.

The several parts of this device may be made of any suitable materials, and the relative sizes and proportions, as well as the general design of the mechanism, may be varied to a considerable extent without departing from the spirit of the invention hereinafter more fully described and specifically claimed.

At 10 and 11 are shown upper and lower socket members in the larger portion of each of which is formed a screw thread for direct coöperation with a threaded end of a guard 12. This guard is made preferably of metal or other strong rigid material of tubular form, and, as intimated, has its ends provided with exterior threads and fitted into said socket members. Each socket member at the inner end of the threaded portion is provided with a shoulder 13 spaced from the adjacent end of the guard for the accommodation of a packing device including a flexible gasket 14 and a pair of metal rings 15 on opposite sides thereof and in direct contact with the shoulder and guard end respectively.

The gage glass proper shown at 16 is of simple, smooth tubular form and has its ends extending through the packing devices and well spaced from the structure of the socket members. The exterior surface of the tube also is spaced from the interior of the guard 12. When the packing gaskets 14 are compressed, due to the tightening of the socket members upon the ends of the guard, they are caused to bind firmly against the gage glass, making a snug fit therefor. The guard is provided with any suitable number of vertical slots 12' through which the water level may be observed within the glass 16. In the space between the glass 16 and the guard 12 at the rear thereof may be slipped a card or other device, or the interior surface of the rear portion of the guard may be colored in any suitable manner to intensify the contrast between those portions of the glass which do and do not contain the water. It will be observed that from the manner of securing the glass 16 in the socket members 10 and 11, the ends of the glass are free so as to permit relative movement between the same and the socket pieces due to any variation in the ratio of expansion and contraction between the gage glass and the guard.

The thimble 17 is of tubular form in the main portion and is fitted loosely within the upper end of the glass 14 or with a clear space between the outer surface of the thimble and the inner surface of the glass, as shown in Figs. 2 and 3. At the upper end of the thimble is formed an outwardly extending supporting flange 18 which keeps the thimble centered in the glass and directs any water of condensation coming toward the thimble from above it through the thimble instead of around it and touching the glass. Such water of condensation flows from the thimble at a point 19 bent inwardly toward the axial center of the glass and thus insuring that the drip water will fall freely with respect to the inner surface of the glass 16. Either or both of the socket pieces 10 and 11 may be provided with undercut shoulders 20; especially should the socket piece 10 at the upper end of the glass be so constructed. This undercut shoulder constitutes the upper boundary of the socket into which the upper end of the glass projects loosely, and the edge of said shoulder constituting the end of the bore 21 insures that the water of condensation will drop upon or through the thimble instead of flowing down the vertical walls of the socket and thus coming into injurious contact with the glass proper.

The lower socket piece has a restricted bore 21' which constitutes a valve seat 24 for a check valve 22 held in the lower end of the socket piece 11 by means of a bar 23. Under normal conditions the ball 22 remains resting idly upon the bar, but in the event of breakage of the glass, whereby the normal balanced pressure in the gage glass is disturbed, said ball will be lifted by the hot water and steam which tends to escape through the broken gage glass and will seat against the valve seat 24 formed at the lower end of the bore 21' whereby danger of scalding of the engineer by hot water is prevented.

I claim:

1. In a safety gage glass, the combination of a socket member whose socket is counterbored and internally threaded forming a shoulder, a packing member comprising a pair of metal rings and a compressible ring between them, one of said metal rings being abutted against said shoulder, a gage glass tube extending through said packing member into but spaced from the walls of the socket member, guard means cooperating with the threaded portion of the socket member and acting against the other of said metal rings to put the compressible ring under compression and making a steam-tight joint between the glass tube and the socket member, and means to direct the condensation water into the interior of the tube and out of contact with the inner wall thereof.

2. In a safety gage glass, the combination of a socket member, a gage glass tube projecting into said socket member and spaced from the inner wall thereof, packing means surrounding the end of the tube and maintaining it centered within the socket member, and a thimble supported upon the end of the tube and maintained coaxial therewith, the lower end of the thimble being tapered and deflected toward the axis.

3. In a safety gage glass, the combination of a socket member having the inner end of its socket undercut forming a shoulder inclined toward the axis of the socket member, a glass tube having its end extending into the socket and spaced from said undercut shoulder and the inner wall of the socket, means maintaining the tube centered in the socket member and providing a steam-tight joint, and a thimble supported above the end of the tube and serving to direct the condensation water received therein into the interior of the tube free from the inner wall thereof, said inclined shoulder serving to direct the condensation water from the upper portion of the socket member into said thimble.

In testimony whereof I have signed my name to this specification in the presence of two subscribing witnesses.

GEORGE ERNST.

Witnesses:
 GEO. L. BEELER,
 PHILIP D. ROLLHAUS.

Copies of this patent may be obtained for five cents each, by addressing the "Commissioner of Patents, Washington, D. C."